(12) United States Patent
Herbig et al.

(10) Patent No.: US 11,935,274 B2
(45) Date of Patent: Mar. 19, 2024

(54) IRIS SCANNING DEVICE WITH A SINGLE CAMERA SENSOR

(71) Applicant: Tools for Humanity Corporation, San Francisco, CA (US)

(72) Inventors: Sandro Herbig, Erlangen (DE); Auguste Pugnet, Erlangen (DE); Alex Blania, Erlangen (DE); Pierre Türschmann, Erlangen (DE)

(73) Assignee: Worldcoin Foundation, Grand Cayman (KY)

( * ) Notice: Subject to any disclaimer, the term of this patent is extended or adjusted under 35 U.S.C. 154(b) by 384 days.

(21) Appl. No.: 17/458,179

(22) Filed: Aug. 26, 2021

(65) Prior Publication Data
US 2023/0060404 A1  Mar. 2, 2023

(30) Foreign Application Priority Data

Aug. 25, 2021 (EP) .................... 21193120

(51) Int. Cl.
G06V 10/00 (2022.01)
G02B 5/30 (2006.01)
(Continued)

(52) U.S. Cl.
CPC ......... G06V 10/147 (2022.01); G02B 5/3083 (2013.01); G02B 27/0093 (2013.01);
(Continued)

(58) Field of Classification Search
CPC ...... G06V 10/147; G06V 40/19; H04N 23/80; G02B 5/3083; G02B 27/0093; G02B 27/283

See application file for complete search history.

(56) References Cited

U.S. PATENT DOCUMENTS 5,717,512 A      2/1998  Chmielewski et al.
8,477,425 B2 *   7/2013  Border ................. G02B 27/017
                                                  359/13
(Continued)

FOREIGN PATENT DOCUMENTS

EP       4141819 A1      3/2023
KR    20070117027 A     12/2007
(Continued)

OTHER PUBLICATIONS

"International Search Report and Written Opinion for PCT Patent Application No. PCT/US22/41511", dated Dec. 23, 2022, 13 pages.
(Continued)

Primary Examiner — Pakee Fang
(74) Attorney, Agent, or Firm — Calfee, Halter & Griswold LLP

(57) ABSTRACT

An iris scanning device that includes a single camera sensor utilized for generating iris scan data is described herein. The iris scanning device includes a selector, a lens, and the camera sensor. The selector is configured to receive a first optical signal representative of a first eye and a second optical signal representative of a second eye. The selector selectively allows a passed optical signal to be optically propagated to the lens and inhibits a blocked optical signal from being optically propagated to the lens during a time period. The passed optical signal is one of the first optical signal or the second optical signal during the time period. The blocked optical signal is a differing one of the first optical signal or the second optical signal during the time period. The lens causes the passed optical signal to be incident on the camera sensor during the time period.

20 Claims, 9 Drawing Sheets

(51) Int. Cl.
  *G02B 27/00* (2006.01)
  *G02B 27/28* (2006.01)
  *G06V 10/147* (2022.01)
  *G06V 40/19* (2022.01)
  *H04N 23/80* (2023.01)

(52) U.S. Cl.
  CPC .......... *G02B 27/283* (2013.01); *G06V 40/19* (2022.01); *H04N 23/80* (2023.01)

(56) References Cited

U.S. PATENT DOCUMENTS

| | | | |
|---|---|---|---|
| 10,049,272 B2 * | 8/2018 | Agrawal | G06F 21/32 |
| 2004/0252277 A1 | 12/2004 | Chmielewski et al. | |
| 2006/0140454 A1 * | 6/2006 | Northcott | A61B 3/1216 |
| | | | 382/117 |
| 2019/0266399 A1 | 8/2019 | Kanamori | |
| 2019/0384974 A1 * | 12/2019 | Twede | G06V 40/19 |

FOREIGN PATENT DOCUMENTS

| | | |
|---|---|---|
| WO | 2010056542 A1 | 5/2010 |
| WO | 2023028221 A1 | 3/2023 |

OTHER PUBLICATIONS

"Extended European Search Report for European Patent Application No. 21193120.9", dated Feb. 25, 2022, 10 pages.
Zhang, et al., "Multispectral Biometrics", doi:10.1007/978-3-319-22485-5, 2016, 232 Pages.
"BMT-20 Binoculars Type Dual Iris Imager for Enrollment", Retrieved From: https://www.cmi-tech.com/product/bmt-20-binoculars-type-dual-iris-imager-for-enrollment/, Retrieved Date: Sep. 9, 2021, 3 Pages.
"Response to the Communication Pursuant to Rule 69 EPC and Invitation Pursuant to Rule 70a(1) EPC for European Patent Application No. 21193120.9", Filed Date: Aug. 31, 2023, 42 pages.

* cited by examiner

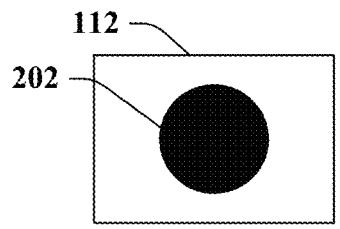
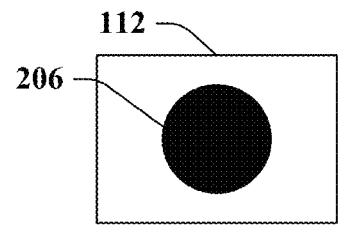
FIG. 2
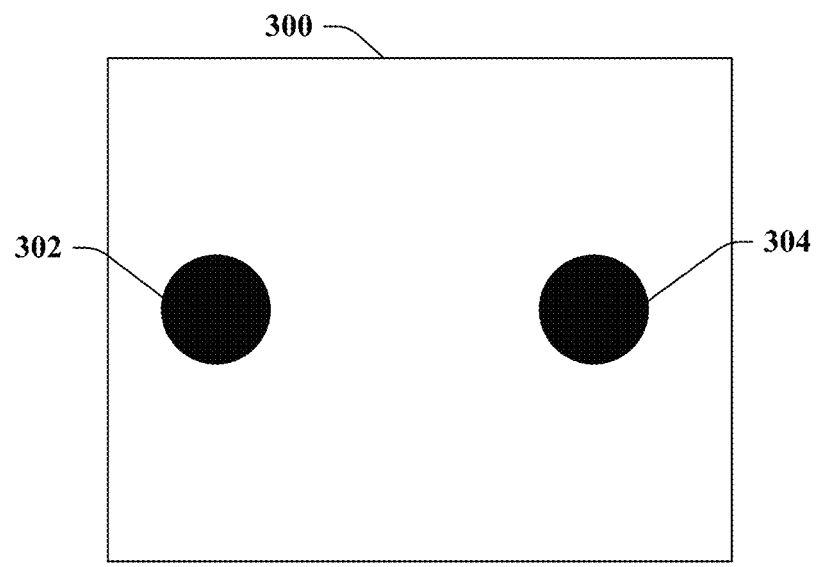
FIG. 3

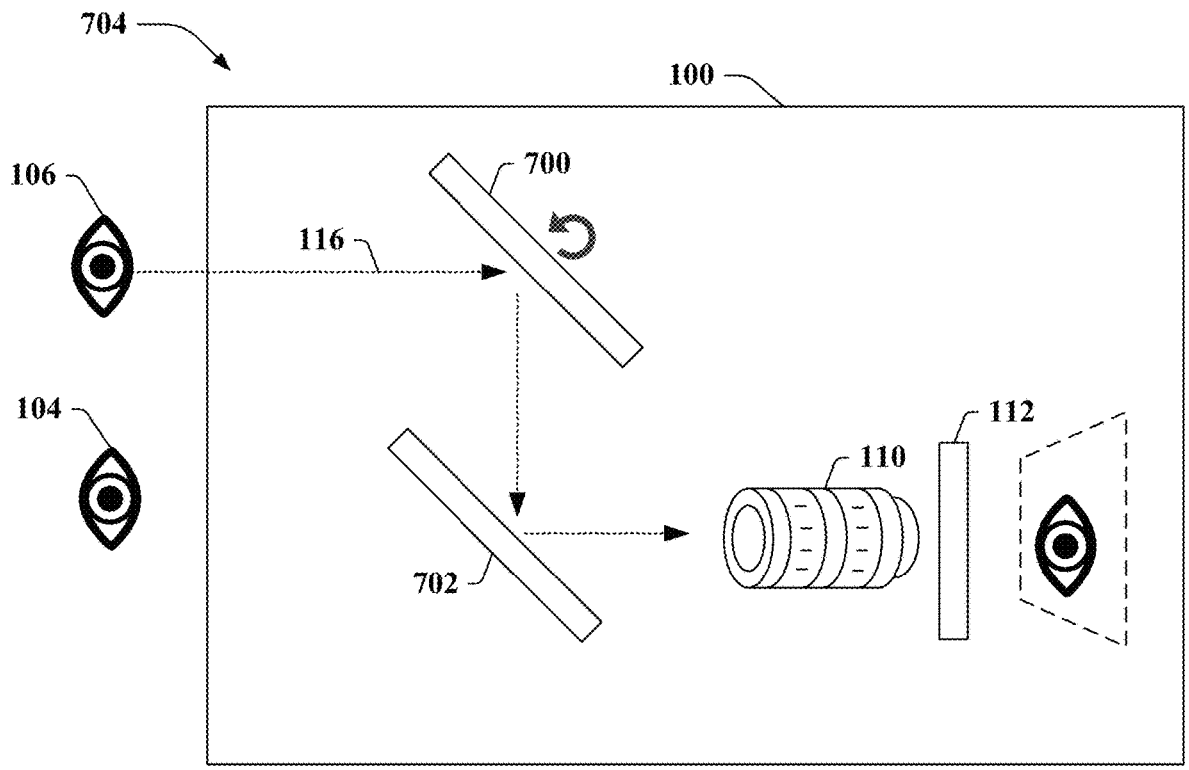
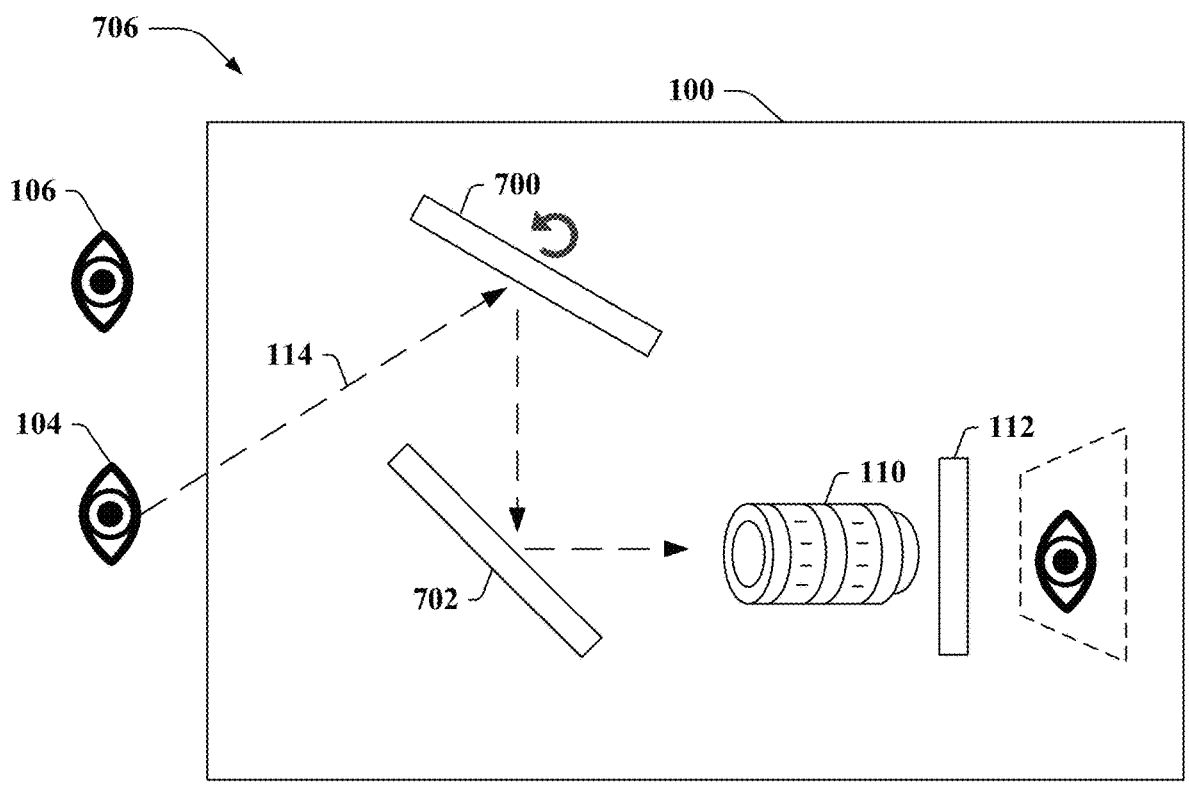
FIG. 7

IRIS SCANNING DEVICE WITH A SINGLE CAMERA SENSOR

RELATED APPLICATION

This application claims priority to European Patent Application No. EP21193120.9, filed on Aug. 25, 2021. The entirety of this application is incorporated herein by reference.

BACKGROUND

Iris scanning is a method of biometric identification that uses pattern-recognition techniques on images of one or both irises of the eyes of a person. Conventional iris scanning devices tend to include two separate camera sensors that respectively scan an iris of a left eye of the person and an iris of a right eye of the person. Inclusion of separate camera sensors, lens, etc. in traditional iris scanning devices can increase weights, costs, and space occupied by such devices.

Conventional iris scanning devices additionally tend to require the person to orient and/or align his/her eyes within a relatively short distance of a camera sensor (e.g., several centimeters). Such orientation and/or alignment may be uncomfortable for the individual. For instance, a person using a traditional iris scanning device may have limited flexibility as to where he/she can be positioned relative to the iris scanning device. Further, it may be time consuming for the person to properly position and/or align his/her eyes relative to the iris scanning device to allow for the iris scan to be effectuated. Moreover, if the person fails to properly position and/or align his/her eyes to the iris scanning device, then quality of iris scan data generated by the iris scanning device may be detrimentally impacted.

Traditional iris scanning devices may have additional shortcomings. For example, conventional iris scanning devices have difficulty tracking the eyes of the person. Moreover, many traditional iris scanning devices may require a person to physically contact the iris scanning device (e.g., if the iris scanning device has a form factor of goggles), which may be unhygienic (e.g., if multiple people use the same iris scanning device over time) and/or intrusive to the person.

SUMMARY

The following is a brief summary of subject matter that is described in greater detail herein. This summary is not intended to be limiting as to the scope of the claims.

Described herein are various technologies that pertain to an iris scanning device that includes a single camera sensor utilized for generating iris scan data. The iris scanning device can be employed to scan irises of eyes of a person. The iris scanning device can include a selector, a lens optically coupled to the selector, and the camera sensor optically coupled to the lens. The selector can be configured to receive a first optical signal and a second optical signal. The first optical signal can be representative of a first eye of the person and the second optical signal can be representative of a second eye of the person. The selector selectively allows a passed optical signal to be optically propagated to the lens during a time period. Moreover, the selector selectively inhibits a blocked optical signal from being optically propagated to the lens during the time period. The passed optical signal is one of the first optical signal (representative of the first eye) or the second optical signal (representative of the second eye) during the time period. Further, the blocked optical signal is a differing one of the first optical signal or the second optical signal during the time period. Moreover, the lens causes the passed optical signal to be incident on the camera sensor during the time period. An output signal (e.g., image(s)) can be generated by the camera sensor (e.g., an image sensor) during the time period; then the iris scanning device can perform image processing on the output signal of the camera sensor to generate iris scan data for one of the first eye or the second eye of the person during the time period.

The selector of the iris scanning device can switch between allowing the first optical signal representative of the first eye or the second optical signal representative of the second eye to be optically propagated to the lens over time. Accordingly, the selector can enable the iris scanning device to switch between generating iris scan data for the first eye to the second eye over time. Thus, when the person is employing the iris scanning device, iris scan data for both eyes can be generated (e.g., in a single session, iris scan data for one eye can be generated during a first time period and iris scan data for the second eye can be generated during a second time period). By way of illustration, during a first time period, the selector can selectively allow the first optical signal to be optically propagated to the lens and can inhibit the second optical signal from being optically propagated to the lens (e.g., the first optical signal can be the passed optical signal and the second optical signal can be the blocked optical signal during the first time period, iris scan data for the first eye can be generated during the first time period). Following this illustration, during a second time period, the selector can selectively allow the second optical signal to be optically propagated to the lens and can inhibit the first optical signal from being optically propagated to the lens (e.g., the second optical signal can be the passed optical signal and the first optical signal can be the blocked optical signal during the second time period, iris scan data for the second eye can be generated during the second time period). Accordingly, at a given time, the selector allows either the first optical signal representative of the first eye or the second optical signal representative of the second eye to go through the lens and be imaged by the camera sensor.

According to various embodiments, the iris scanning device can further include front end optics and a polarization beam splitter in addition to the selector, the lens, and the camera sensor. The front end optics can be configured to receive the first optical signal from the first eye of the person and the second optical signal from the second eye of the person. Moreover, the polarization beam splitter can optically propagate a first portion of the first optical signal having a first polarization to the selector and a second portion of the second optical signal having a second polarization to the selector. The first polarization and the second polarization are orthogonal to each other. The polarization beam splitter can further inhibit optical propagation of a second portion of the first optical signal having the second polarization to the selector and a first portion of the second optical signal having the first polarization to the selector. Pursuant to such embodiments, the selector can be or include a polarization selector that allows one of the first polarization or the second polarization to pass and inhibits a differing one of the first polarization or the second polarization.

In various embodiments where the iris scanning device includes the front end optics and the polarization beam splitter in addition to the polarization selector, the lens, and the camera sensor, the iris scanning device can further include a quarter waveplate (QWP) and a mirror. The polarization beam splitter (PBS) can reflect a reflected portion of the first optical signal having the first polarization to the polarization selector. Moreover, the polarization beam splitter can reflect a reflected portion of the second optical signal having the first polarization towards the mirror. The reflected portion of the second optical signal reflected by the polarization beam splitter having the first polarization can pass through the quarter waveplate, be reflected by the mirror, pass through the quarter waveplate again, and return to the polarization beam splitter having rotated the polarization by 90° to the second polarization. Further, the polarization beam splitter can transmit the reflected portion of the second optical signal that returns to the polarization beam splitter having the second polarization to the polarization selector (e.g., the reflected portion of the second optical signal that returns to the polarization beam splitter having the second polarization can be the second portion of the second optical signal having the second polarization). Such embodiments can enable an eye to be imaged in a straight manner so as to minimize undesirable optical effects.

In other embodiments where the iris scanning device includes the front end optics and the polarization beam splitter in addition to the polarization selector, the lens, and the camera sensor, the front end optics can include a first mirror, a second mirror, and a third mirror. The first mirror can be configured to reflect the first optical signal from the first eye to the polarization beam splitter. Moreover, the second mirror can be configured to reflect the second optical signal from the second eye to the third mirror, and the third mirror can be configured to reflect the second optical signal from the second mirror to the polarization beam splitter.

Pursuant to other embodiments, the selector of the iris scanning device can include a movable mirror and a stationary mirror. The movable mirror can be controllable to align with one of the first eye or the second eye of the person during the time period such that the passed optical signal representative of the first eye or the second eye is reflected by the movable mirror to the stationary mirror and thereafter is reflected by the stationary mirror to the lens. Thus, the movable mirror can be aligned with the first eye during a first time period and can be aligned with the second eye during a second time period.

The iris scanning device described herein includes a single camera sensor utilized for generating iris scan data. The single camera sensor is used to generate iris scan data of both eyes of the person without the person needing to reposition the iris scanning device. In contrast, many conventional iris scanning devices include separate camera sensors for scanning the eyes (e.g., irises of the eyes) of a person (e.g., a first camera sensor is used for a right eye and a second camera sensor is used for the left eye). By including a single camera sensor as opposed to two or more separate camera sensors, the iris scanning device set forth herein can be less bulky, less costly, and can weigh less as compared to many conventional iris scanning devices.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIG. 2 illustrates exemplary representations of a camera sensor during two different time periods.

FIG. 3 illustrates an exemplary representation of a camera sensor for concurrently scanning both eyes of a person.

FIG. 7 illustrates another example of the iris scanning device of FIG. 1.

DETAILED DESCRIPTION

Figure 1:
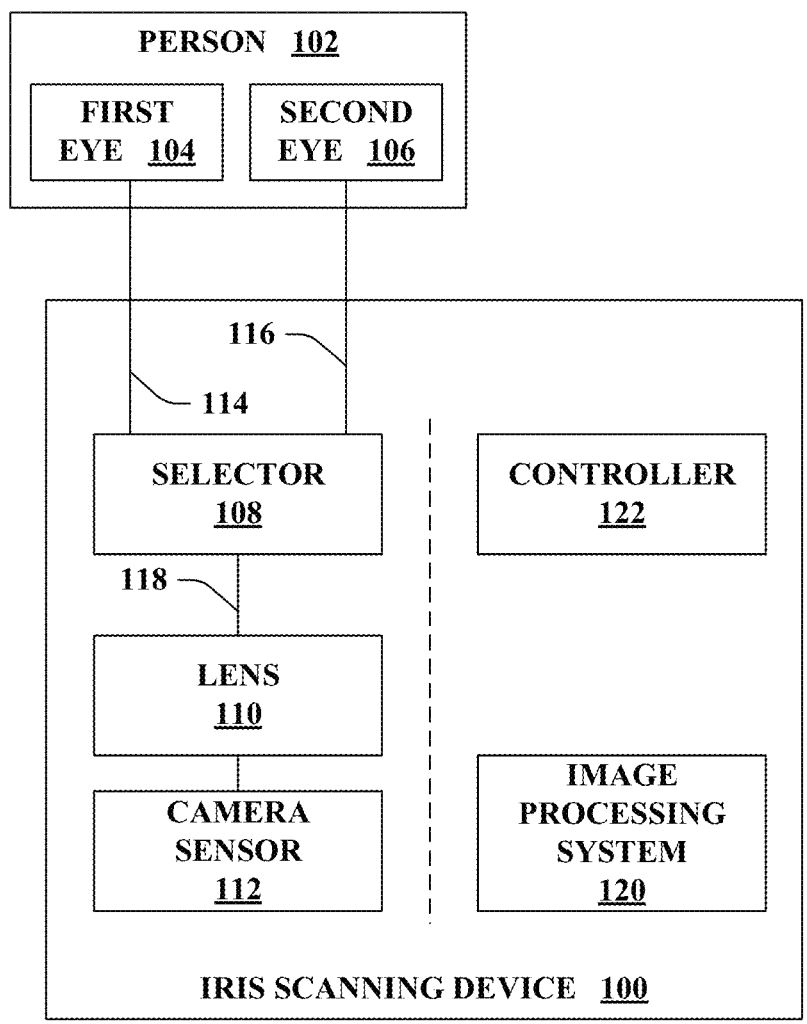
FIG. 1 illustrates a functional block diagram of an exemplary iris scanning device that is configured to scan irises of the eyes of a person.

Various technologies pertaining to an iris scanning device that includes a single camera sensor utilized for generating iris scan data of both eyes of a person are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean "serving as an illustration or example of something."

The terms "first" and "second" are used herein for purposes of identification (e.g., a first eye and a second eye are different eyes of a person, the first eye can be the right eye and the second eye can be the left eye, the first eye can be the left eye and the second eye can be the right eye). However, unless otherwise specified or evident from the context, these terms are not intended to specify any particular ordering or relation. For instance, a first optical signal and a second optical signal can be concurrently received, received during differing time periods, etc.

The term "optical signal" is used herein to refer to a light beam prior to the light beam being incident on a camera sensor.

The term "passed optical signal" is used herein to refer to an optical signal that is allowed to be optically propagated by an optical element (e.g., a selector), whereas the term "blocked optical signal" is used herein to refer to an optical signal that is inhibited from being optically propagated by the optical element. For instance, the passed optical signal can refer to a transmitted light beam (e.g., transmitted by a particular optical element), and the blocked optical signal can refer to a non-transmitted light beam (e.g., a light beam that is not propagated by a particular optical element).

The term "portion of an optical signal" refers to either a partially reflected optical signal or a partially transmitted optical signal.

The term "front end optics" is used herein to refer to one or more optical elements through which one or more optical signals can optically propagate prior to reaching a polarization beam splitter.

Referring now to the drawings, FIG. 1 illustrates an exemplary iris scanning device 100 that is configured to scan irises of the eyes of a person 102 (e.g., a first eye 104 and a second eye 106 of the person 102). It is contemplated that the iris scanning device 100 (also referred to as "the orb 100") is a handheld device that is held in a hand or hands of the person 102 (or in a hand or hands of another person that is in proximity to the person 102). Additionally or alternatively, it is to be appreciated that the iris scanning device 100 can be stationary (e.g., attached to a surface, set on a surface). According to various embodiments, the iris scanning device 100 can be spherical (or approximately spherical); however, it is to be appreciated that the iris scanning device 100 can be other shapes in other embodiments. The iris scanning device 100 can include a casing that defines a volume inside of the iris scanning device 100, where some or all of the components of the iris scanning device 100 (to be described below) are located within a volume defined by the casing.

The iris scanning device 100 includes a selector 108, a lens 110, and a camera sensor 112. The lens 110 is optically coupled to the selector 108, and the camera sensor 112 is optically coupled to the lens 110. The selector 108 is configured to receive a first optical signal 114 and a second optical signal 116. The first optical signal 114 is representative of the first eye 104 of the person 102, and the second optical signal 116 is representative of the second eye 106 of the person 102. For instance, the first eye 104 can be a right eye and the second eye 106 can be a left eye of the person 102. Alternatively, the first eye 104 can be the left eye and the second eye 106 can be the right eye of the person 102. While not shown in FIG. 1, it is contemplated that the iris scanning device 100 can include various optical element(s) that receive the first optical signal 114 and the second optical signal 116 from the eyes 104 and 106 of the person 102 and optically propagate such optical signals 114 and 116 (or portions thereof) to the selector 108.

The selector 108 can selectively allow a passed optical signal 118 to be optically propagated to the lens 110 during a time period. Moreover, the selector 108 can selectively inhibit a blocked optical signal from being optically propagated to the lens 110 during the time period. The passed optical signal 118 is one of the first optical signal 114 or the second optical signal 116 during the time period. Further, the blocked optical signal is a differing one of the first optical signal 114 or the second optical signal 116 during the time period. Moreover, the lens 110 causes the passed optical signal 118 to be incident on the camera sensor 112 during the time period. The lens 110 can further enable focusing the passed optical signal 118 on the camera sensor 112; for instance, the lens 110 can be controlled to focus on the iris (rather than an eyelash).

It is contemplated that various selector types can be included in the iris scanning device 100 in differing embodiments. In various embodiments, the selector 108 can be a polarization selector. The polarization selector can be an electrooptical polarization selector (e.g., an electrooptical polarizer, an electrooptical switch) or a mechanical polarization selector. In other embodiments, the selector 108 can include a movable mirror and a stationary mirror, where the movable mirror is controllable to align with the first eye 104 or the second eye 106 of the person 102 at a given time. It is also to be appreciated that in various embodiments the selector 108 can include two shutters.

The camera sensor 112 (also referred to as an image sensor) is a sensor that detects and conveys information used to generate an image based on the passed optical signal 118 that is incident thereupon. Various camera sensor types are intended to fall within the scope of the hereto appended claims. For instance, the camera sensor 112 can be a charge-coupled device (CCD) image sensor or a complementary metal-oxide-semiconductor (CMOS) image sensor. Moreover, in various embodiments, the camera sensor 112 can be a global shutter image sensor, which can mitigate rolling shutter artifacts and can facilitate reducing motion blur.

The iris scanning device 100 can further include an image processing system 120. The image processing system 120 can be implemented in hardware, software, or a combination thereof. An output signal can be generated by the camera sensor 112 during the time period. The output signal generated by the camera sensor 112 can include, for example, one or more images (e.g., grayscale image(s), color image (s)). The image processing system 120 of the iris scanning device 100 can perform image processing on the output signal of the camera sensor 112 to generate iris scan data for one of the first eye 104 or the second eye 106 of the person during the time period. According to various examples, the image processing system 120 can locate an eye in an image, identify an iris of the eye in the image, and capture the image of the iris (e.g., in a desired resolution and sharpness, images of irises of both eyes 104 and 106 can be captured). Moreover, in various examples, image processing performed by the image processing system 120 can include various post processing of the image of the iris (or the images of the irises). For instance, the image processing system 120 can create an iris code representative of the iris (or representative of both irises of the person 102) based on the captured image of the iris (or irises). Other types of post processing performed by the image processing system 120 is also intended to fall within the scope of the hereto appended claims (e.g., liveness detection, metadata).

The selector 108 of the iris scanning device can switch between allowing the first optical signal 114 representative of the first eye or the second optical signal 116 representative of the second eye to be optically propagated to the lens 110 over time. Accordingly, the selector 108 can enable the iris scanning device 100 to switch between generating iris scan data for the first eye 104 or the second eye 106 over time (e.g., the image processing system 120 can generate iris scan data for the first eye 104 during a first time period and can generate iris scan data for the second eye 106 during a second time period, the first time period and the second time period can be within a single session during which the person 102 utilizes the iris scanning device 100). Thus, the passed optical signal 118 can be the differing one of the first optical signal 114 or the second optical signal 116 during a differing time period (e.g., the optical signal that was inhibited from being optically propagated during the time period can be optically propagated to the lens 110 during the differing time period), whereas the optical signal that was optically propagated during the time period can be inhibited from being optically propagated during the differing time period.

By way of illustration, during a first time period, the selector 108 can selectively allow the first optical signal 114 to be optically propagated to the lens 110 and can inhibit the second optical signal 116 from being optically propagated to the lens 110 (e.g., the first optical signal 114 can be the passed optical signal 118 and the second optical signal 116 can be the blocked optical signal during the first time period, iris scan data for the first eye 104 can be generated during the first time period). Following this illustration, during a second time period, the selector 108 can selectively allow the second optical signal 116 to be optically propagated to the lens 110 and can inhibit the first optical signal 114 from being optically propagated to the lens 110 (e.g., the second optical signal 116 can be the passed optical signal 118 and the first optical signal 114 can be the blocked optical signal during the second time period, iris scan data for the second eye 106 can be generated during the second time period). Accordingly, at a given time, the selector 108 allows either the first optical signal 114 representative of the first eye 104 or the second optical signal 116 representative of the second eye 106 to go through the lens 110 and be imaged by the camera sensor 112.

The iris scanning device 100 can further include a controller 122 that causes the selector 108 to switch between allowing the first optical signal 114 or the second optical signal 116 to be optically propagated to the lens 110 over time. The controller 122 can be implemented in hardware, software, or a combination thereof. For example, the controller 122 can be or include a printed circuit board, which can provide an electrical control signal to the selector 108 to control operation of the selector 108 (e.g., the electrical control signal can cause the selector 108 to switch which optical signal 114 or 116 is to be optically propagated to the lens 110, the electrical control signal can specify which optical signal 114 or 116 is to be optically propagated to the lens 110).

According to various embodiments, the iris scanning device 100 can further include a computing system. The computing system can include a processor and memory, where the memory stores computer-executable instructions that can be executed by the processor. For instance, the memory can include the image processing system 120 and/or the controller 122. However, as noted above, it is contemplated that the image processing system 120 and/or the controller 122 can be implemented (at least partially) in hardware.

The iris scanning device 100 includes a single camera sensor utilized for generating iris scan data, namely, the camera sensor 112. By employing the techniques described herein, the iris scanning device 100 switches between using the single camera sensor 112 for scanning an iris of the first eye 104 and scanning an iris of the second eye 106. Thus, the single camera sensor 112 is used to generate iris scan data of both eyes 104 and 106 of the person 102 without the person 102 needing to reposition the iris scanning device 100. In contrast, many conventional iris scanning devices include separate camera sensors for scanning the eyes (e.g., irises of the eyes) of a person (e.g., a first camera sensor is used for a right eye and a second camera sensor is used for the left eye). By including the single camera sensor 112 as opposed to separate camera sensors, the iris scanning device 100 set forth herein can be less bulky, less costly, and can weigh less as compared to many conventional iris scanning devices.

While the iris scanning device 100 is described herein as including a single camera sensor 112 for generating iris scan data, it is contemplated that in some embodiments the iris scanning device 100 can include a differing camera (or differing cameras) that can be employed for generating images for purposes other than for generating iris scan data (e.g., to detect a position of a face of the person 102 relative to the iris scanning device 100). While the iris scanning device 100 can include other camera(s), the camera sensor 112 is the only camera sensor included in the iris scanning device 100 for scanning iris(es) of the person 102.

Moreover, the iris scanning device 100 described herein can have a greater range as compared to conventional iris scanning devices. For example, the iris scanning device 100 can have a maximum range of 15-50 cm, whereas many conventional iris scanning devices can have a maximum range of 5-10 cm.

According to various examples, the iris scanning device 100 can initiate generating iris scan data of the eyes 104 and 106 of the person 102 responsive to user input.

With reference to FIG. 2, illustrated are exemplary representations of the camera sensor 112 during two different time periods, namely, a time period 1 and a time period 2. As shown at 200, an optical signal representative of a first iris (e.g., of the first eye 104 of the person 102) can be incident on the camera sensor 112 during the time period 1; a subset 202 of pixels of the camera sensor 112 output data corresponding to the first iris during time period 1. Moreover, as shown at 204, an optical signal representative of a second iris (e.g., of the second eye 106 of the person 102) can be incident on the camera sensor 112 during the time period 2; a subset 206 of pixels of the camera sensor 112 output data corresponding to the second iris during time period 2. Various resolutions of the camera sensor 112 are intended to fall within the scope of the hereto appended claims. For instance, the camera sensor 112 of the iris scanning device 100 can include 1.6 megapixels, 2.3 megapixels, or the like.

In contrast to imaging one iris of one eye during a given time period, if both irises are to be imaged concurrently, then a larger camera sensor would be needed to output data where a similar number of pixels correspond to each of the irises. FIG. 3 depicts a camera sensor 300 with approximately 10 times as many pixels as compared to the camera sensor 112 of FIG. 2 (e.g., the camera sensor 112 of the iris scanning device 100 depicted in FIG. 2 can include 1.6 megapixels and the camera sensor 300 of FIG. 3 can include 16 megapixels). As illustrated in FIG. 3, a first subset 302 of pixels of the camera sensor 300 can output data corresponding to the first iris and a second subset 304 of pixels of the camera sensor 300 can output data corresponding to the second iris. The first subset 302 of pixels of the camera sensor 300 and the subset 202 of pixels of the camera sensor 112 can include a substantially similar number of pixels. Likewise, the second subset 304 of pixels of the camera sensor 300 and the subset 206 of pixels of the camera sensor 112 can include a substantially similar number of pixels.

As compared to the camera sensor 300 that concurrently scans both eyes (e.g., both irises) of a person, scanning a single eye (e.g., a single iris) during a given time period enables a greater percentage of the overall number of pixels of the camera sensor 112 to be used for outputting information pertaining to an iris being imaged. Thus, a greater percentage of the overall area of the camera sensor 112 can be used for generating data pertaining to an iris (as compared to the percentage of the overall area of the camera sensor 300 used for generating data pertaining to the irises). Accordingly, sequentially imaging the irises of the eyes of the person allows for the full area of the camera sensor 112 to be used for each iris (e.g., both eyes do not need to fit on the camera sensor as well as space there between), which allows for providing higher resolution output for each eye.

It is contemplated that the iris scanning device 100 described herein can switch between scanning an iris of one eye and scanning an iris of the other eye with substantially any frequency. For example, the frequency of switching can be on the order of 10 s of millisecond, on the order of seconds, or the like. For instance, the switching frequency can be shortened to allow for faster iris scanning to be performed (e.g., the switching frequency can be limited by a duration of time needed to effectuate switching which can be between 20-80 milliseconds).

Figure 4:
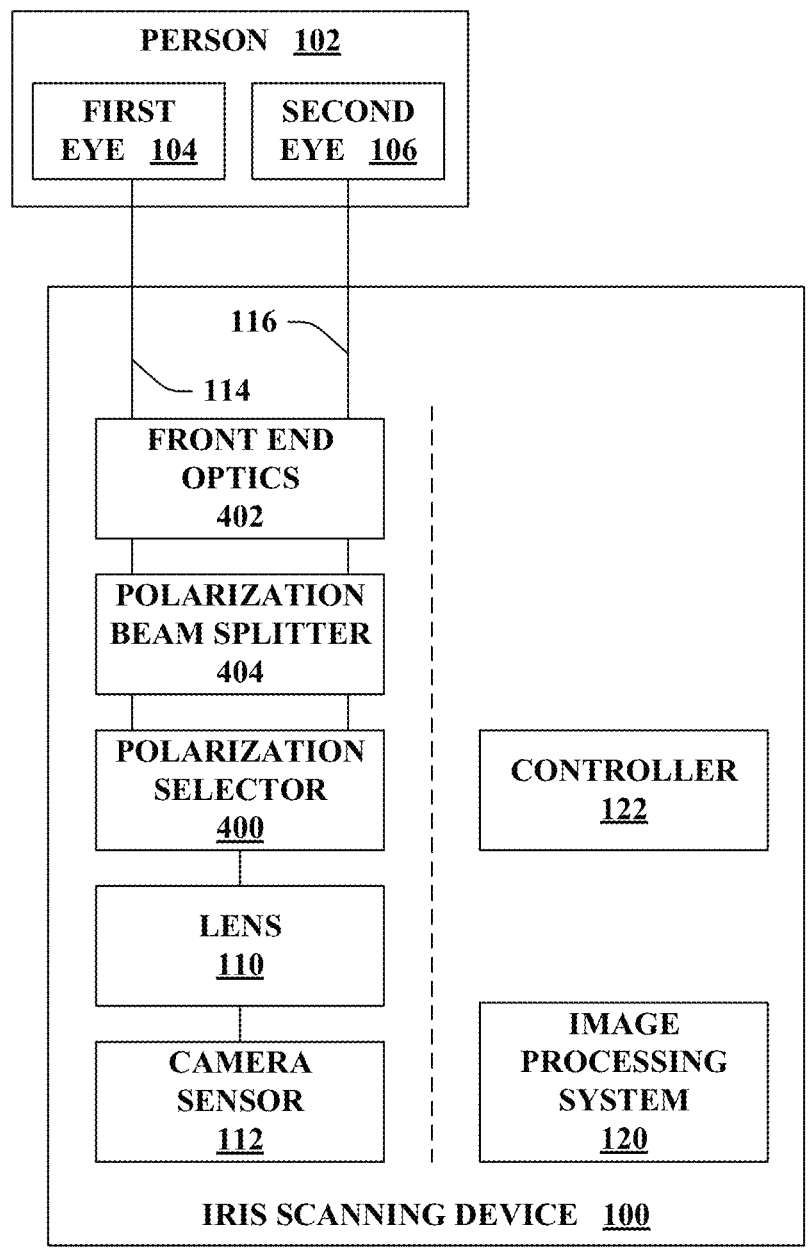
FIG. 4 illustrates a functional block diagram of an example of the iris scanning device of FIG. 1.

Now turning to FIG. 4, illustrated is an example of the iris scanning device 100 of FIG. 1. As shown in FIG. 4, the iris scanning device 100 again includes the lens 110, the camera sensor 112, the image processing system 120, and the controller 122. In the example of FIG. 4, the selector 108 of the iris scanning device 100 can be or include a polarization selector 400. Moreover, the iris scanning device 100 of FIG. 4 includes front end optics 402 and a polarization beam splitter 404. As illustrated, the polarization beam splitter 404 is optically coupled to the front end optics 402, the polarization selector 400 is optically coupled to the polarization beam splitter 404, the lens is optically coupled to the polarization selector 400, and the camera sensor 112 is optically coupled to the lens 110. The iris scanning device 100 of FIG. 4 utilizes polarizations of the first optical signal 114 and the second optical signal 116 to allow for selectively permitting one of the optical signals 114 or 116 for one of the eyes 104 or 106 to pass to the lens 110 and the camera sensor 112 based on the particular eye 104 or 106 being imaged during a given time period.

The front end optics 402 can be configured to receive the first optical signal 114 from the first eye 104 of the person 102 and the second optical signal 116 from the second eye 106 of the person 102. Further, the polarization beam splitter 404 can optically propagate a first portion of the first optical signal 114 having a first polarization to the polarization selector 400 (e.g., the selector 108) and a second portion of the second optical signal 116 having a second polarization to the polarization selector 400 (e.g., the selector 108). The polarization beam splitter 404 can further inhibit optical propagation of a second portion of the first optical signal 114 having the second polarization to the polarization selector 400 (e.g., the selector 108) and a first portion of the second optical signal having the first polarization to the polarization selector 400 (e.g., the selector 108). The first polarization and the second polarization are orthogonal to each other.

The polarization selector 400 can allow one of the first polarization or the second polarization to pass to the lens 110, while inhibiting a differing one of the first polarization or the second polarization from passing to the lens 110. For instance, during a given time period, the polarization selector 400 can allow P polarization to pass (e.g., the optical signal having P polarization can be optically propagated to the lens 110 and the lens 110 can cause such optical signal having P polarization to be incident on the camera sensor 112 during the given time period); thus, the optical signal having P polarization can be the passed optical signal during the given time period. Further, during a differing time period, the polarization selector 400 can allow S polarization to pass (e.g., the optical signal having S polarization can be optically propagated to the lens 110 and the lens 110 can cause such optical signal having S polarization to be incident on the camera sensor 112 during the differing time period); accordingly, the optical signal having the S polarization can be the passed optical signal during the differing time period.

Pursuant to an example, the polarization selector 400 can be an electrooptical polarization selector. The electrooptical polarization selector, for instance, can include an electrically controllable halfwave plate and a polarizer (e.g., the electrically controllable halfwave plate is in front of the polarizer). The controller 122 can provide an electrical control signal to the electrically controllable halfwave plate to control whether the halfwave plate is transmissive (e.g., does not optically alter an optical signal passing there through) or operates as a halfwave plate (e.g., turns P polarization to S polarization, turns S polarization to P polarization). Accordingly, a state of the electrically controllable halfwave plate can control whether the optical signal having the first polarization or the optical signal having the second polarization passes through the polarizer (e.g., one of the S polarization or the P polarization can pass through the electrooptical polarization selector at a given time).

In accordance with another example, the polarization selector 400 can be a mechanical polarization selector. The mechanical polarization selector, for instance, can include two polarization filters that can be mechanically changed over time (e.g., a first polarization filter can be used during a first time period and a second polarization filter can be used during a second time period, a first polarization filter can be mechanically rotated relative to a second polarization filter over time to alter the polarization).

As noted herein, the first polarization and the second polarization are orthogonal to each other. Moreover, P polarization and S polarization are used as an example of polarizations that are orthogonal to each other. Further, a particular polarization can depend on a reference frame; thus, the claimed subject matter is not limited to the first polarization being S polarization and the second polarization being P polarization as set forth in some examples herein.

Figure 5:
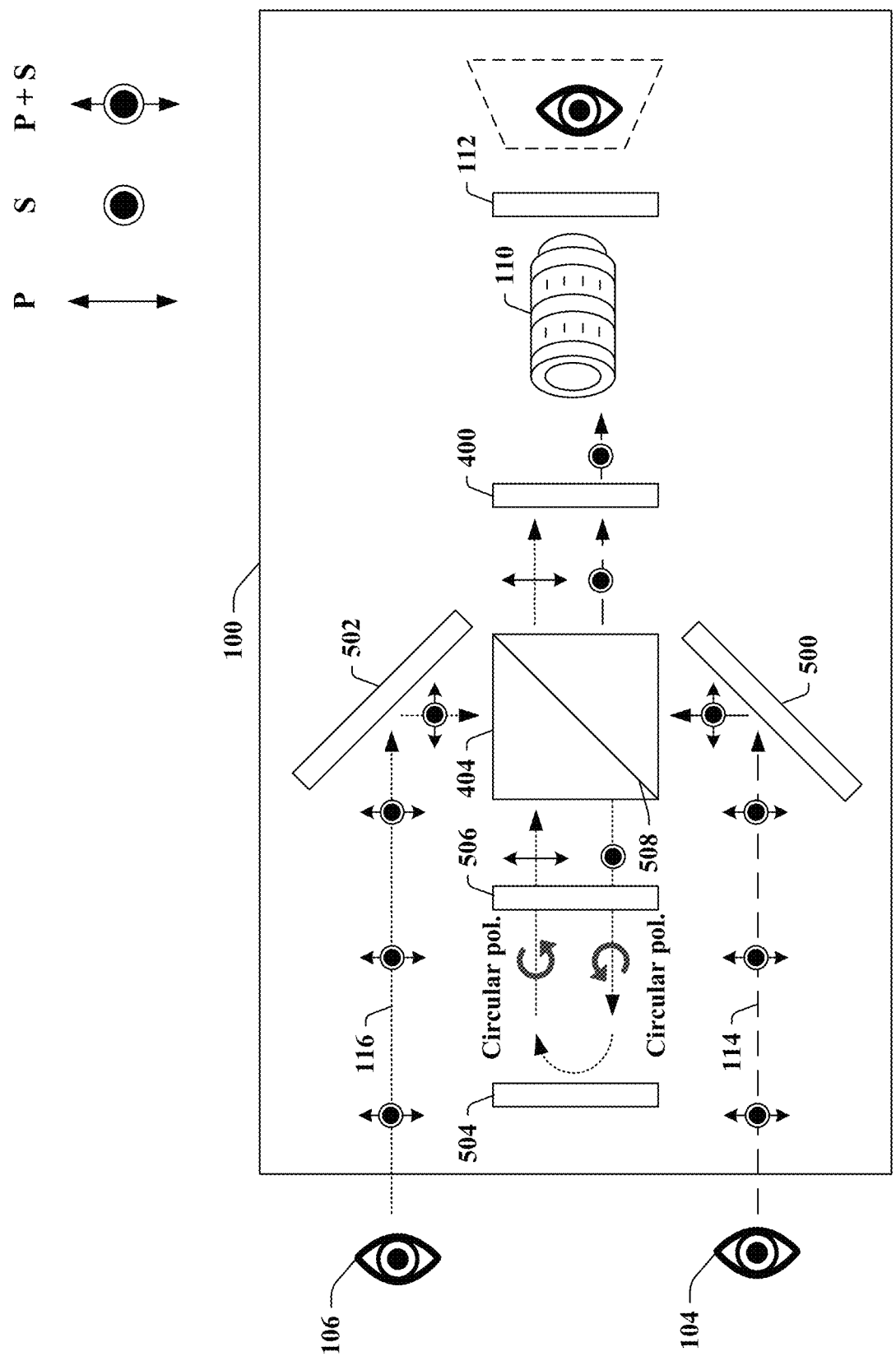
FIG. 5 illustrates an example of the iris scanning device of FIG. 4.

FIG. 5 depicts an example of the iris scanning device 100 of FIG. 4. The iris scanning device 100 of FIG. 5 includes front end optics (e.g., the front end optics 402), the polarization beam splitter 404, the polarization selector 400, the lens 110, and the camera sensor 112. The front end optics of the iris scanning device 100 shown in FIG. 5 include a first mirror 500 and a second mirror 502. Further, the iris scanning device 100 depicted in FIG. 5 includes a third mirror 504 and a quarter waveplate 506.

The first mirror 500 of the front end optics is configured to reflect the first optical signal 114 from the first eye 104 to the polarization beam splitter 404. Moreover, the second mirror 502 of the front end optics is configured to reflect the second optical signal 116 from the second eye 106 to the polarization beam splitter 404. The first mirror 500 can be a movable mirror that can align with the first eye 104. Moreover, the second mirror 502 can be a movable mirror that can align with the second eye 106. Further, the first optical signal 114 received at and reflected by the first mirror 500 can include both P and S polarizations. Likewise, the second optical signal 116 received at and reflected by the second mirror 502 can include both P and S polarizations.

The polarization beam splitter 404 can optically propagate a first portion of the first optical signal 114 having a first polarization to the polarization selector 400. As illustrated, the first portion of the first optical signal 114 having S polarization is reflected by a polarizing mirror 508 of the polarization beam splitter 404 towards the polarization selector 400. Moreover, the polarization beam splitter 404 inhibits optical propagation of a second portion of the first optical signal 114 having a second polarization to the polarization selector 400. For instance, the second portion of the first optical signal 114 having P polarization can pass through the polarizing mirror 508 (e.g., without being reflected towards the polarization selector 400). A path of the second portion of the first optical signal 114 having P polarization is not shown in FIG. 5, as this portion of the first optical signal 114 may be discarded.

The polarization beam splitter 404 can also optically propagate a second portion of the second optical signal 116 having the second polarization to the polarization selector 400, and can inhibit optical propagation of a first portion of the second optical signal 116 having the first polarization to the polarization selector 400. As depicted in FIG. 5, the second portion of the second optical signal 116 having P polarization is optically propagated by the polarization beam splitter 404 towards the polarization selector 400 (in an indirect manner). More particularly, the polarization beam splitter 404 (e.g., the polarizing mirror 508) can reflect a reflected portion of the second optical signal 116 towards the third mirror 504. The reflected portion of the second optical signal 116 reflected by the polarization beam splitter 404 can have the first polarization (e.g., S polarization). The reflected portion of the second optical signal 116 can pass through the quarter waveplate 506 (e.g., the polarization can be turned into circular polarization), be reflected by the third mirror 504, pass through the quarter waveplate 506 again, and return to the polarization beam splitter 404 having the second polarization (e.g., P polarization). By passing through the quarter waveplate 506 twice, the polarization of the reflected portion of the second optical signal 116 can be rotated from the first polarization to the second polarization (e.g., rotated 90 degrees). The reflected portion of the second optical signal 116 that returns to and passes through the polarization beam splitter 404 (e.g., passes through the polarizing mirror 508) having the second polarization is the second portion of the second optical signal 116 having the second polarization (e.g., which is optically propagated by the polarization beam splitter 404 to the polarization selector 400).

Moreover, as described above, the polarization selector 400 selectively allows the passed optical signal to be optically propagated to the lens 110 during a time period and inhibits the blocked optical signal from being optically propagated to the lens during the time period. The passed optical signal is one of the first portion of the first optical signal 114 having the first polarization or the second portion of the second optical signal 116 having the second polarization. Further, the blocked optical signal is a differing one of the first portion of the first optical signal 114 having the first polarization or the second portion of the second optical signal 116 having the second polarization. For instance, as depicted in FIG. 5, the polarization selector 400 is selectively allowing the first portion of the first optical signal 114 having S polarization to be optically propagated to the lens 110 during a particular time period; in this example, the lens 110 causes the passed optical signal (e.g., the first portion of the first optical signal 114 having S polarization representative of the first eye 104) to be incident on the camera sensor 112 during the time period (e.g., to generate iris scan data for the iris of the first eye 104). Moreover, during a differing time period, the polarization selector 400 can selectively allowing the second portion of the second optical signal 116 having P polarization to instead be optically propagated to the lens 110, where the lens 110 can cause such passed optical signal to be incident on the camera sensor 112 during the differing time period (e.g., to generate iris scan data for the iris of the second eye 106).

As depicted in FIG. 5, the polarization selector 400 is in a state (during a corresponding time period) where the first optical signal 114 is allowed to optically propagate to the lens 110, and thus, iris scan data for the iris of the first eye 104 can be generated (e.g., the first optical signal 114 having S polarization passes from the polarization selector 400 to the lens 110 and is incident upon the camera sensor 112 for image processing). Although not shown, it is to be appreciated that the polarization selector 400 can switch to a differing state (during a differing time period) where the second optical signal 116 is allowed to optically propagate to the lens 110, and thus, iris scan data for the iris of the second eye 106 can be generated (e.g., the second optical signal 116 having P polarization passes from the polarization selector 400 to the lens 110 and is incident upon the camera sensor 112 for image processing).

Figure 6:
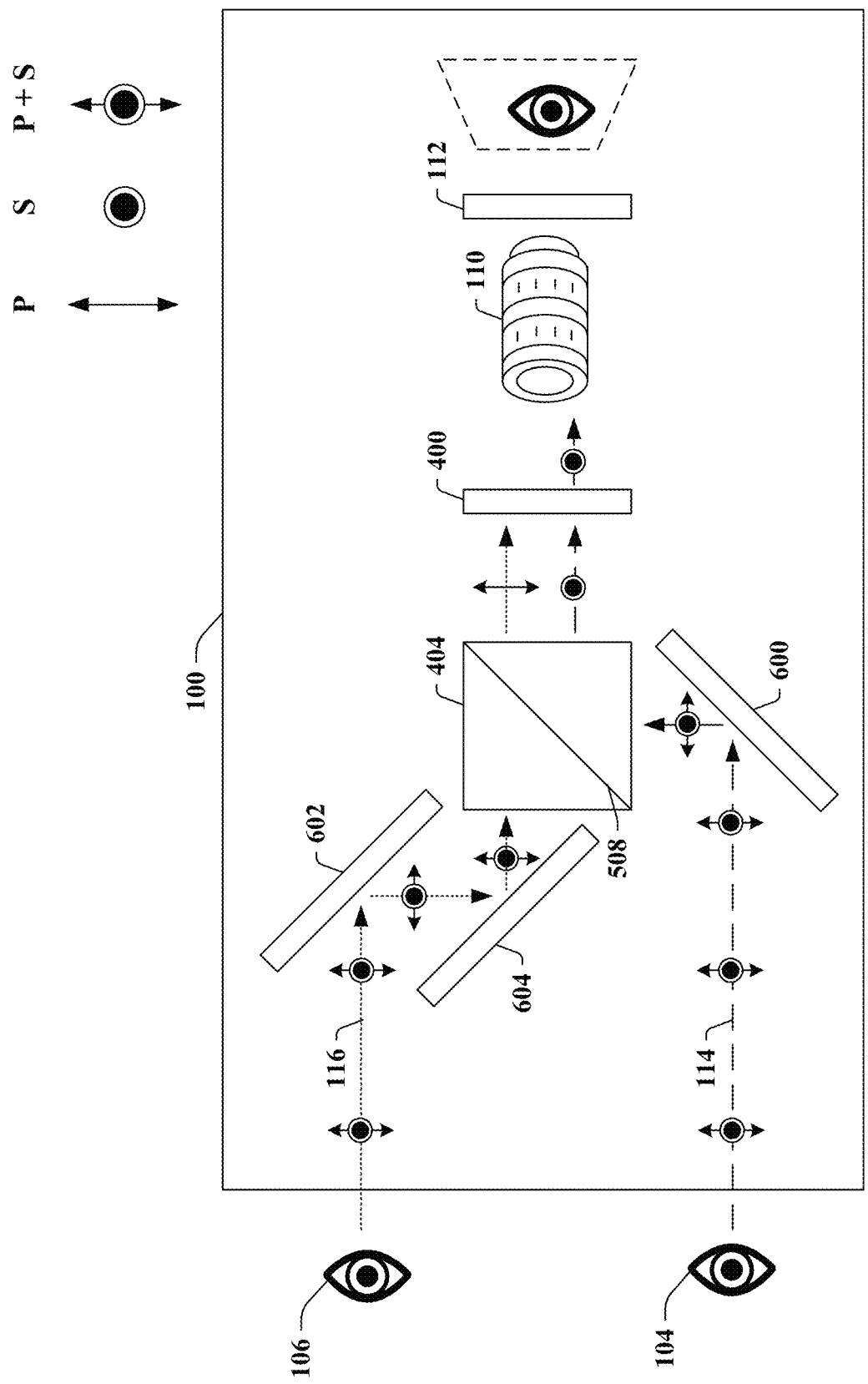
FIG. 6 illustrates another example of the iris scanning device of FIG. 4.

Turning to FIG. 6, depicted is another example of the iris scanning device 100 of FIG. 4. The iris scanning device 100 of FIG. 6 again includes the front end optics (e.g., the front end optics 402), the polarization beam splitter 404, the polarization selector 400, the lens 110, and the camera sensor 112. In the example of FIG. 6, the front end optics of the iris scanning device 100 includes a first mirror 600, a second mirror 602, and a third mirror 604.

The first mirror 600 of the front end optics is configured to reflect the first optical signal 114 from the first eye 104 to the polarization beam splitter 404. Further, the second mirror 602 of the front end optics is configured to reflect the second optical signal 116 from the second eye 106 to the third mirror 604, and the third mirror 604 is configured to reflect the second optical signal 116 from the second mirror 602 to the polarization beam splitter 404. The first mirror 600 can be a movable mirror that can align with the first eye 104. Moreover, the second mirror 602 can be a movable mirror that can align with the second eye 106. Further, the third mirror 604 can be a stationary mirror. The first optical signal 114 received at and reflected by the first mirror 600 can include both P and S polarizations. Likewise, the second optical signal 116 received at and reflected by the second mirror 602 and the third mirror 604 can include both P and S polarizations.

In the embodiment shown in FIG. 6, the polarization beam splitter can optically propagate a first portion of the first optical signal 114 having a first polarization to the polarization selector 400. As illustrated, the first portion of the first optical signal 114 having S polarization is reflected by the polarizing mirror 508 of the polarization beam splitter 404 towards the polarization selector 400. Moreover, the polarization beam splitter 404 inhibits optical propagation of a second portion of the first optical signal 114 having a second polarization to the polarization selector 400. For instance, the second portion of the first optical signal 114 having P polarization can pass through the polarizing mirror 508 (e.g., without being reflected towards the polarization selector 400). A path of the second portion of the first optical signal 114 having P polarization is not shown in FIG. 6, as this portion of the first optical signal 114 may be discarded.

The polarization beam splitter 404 can also optically propagate a second portion of the second optical signal 116 having the second polarization to the polarization selector 400, and can inhibit optical propagation of a first portion of the second optical signal 116 having the first polarization to the polarization selector 400. As depicted in FIG. 6, the second portion of the second optical signal 116 having P polarization is optically propagated by the polarization beam splitter 404 towards the polarization selector 400. The polarization beam splitter 404 (e.g., the polarizing mirror 508) can allow the second portion of the second optical signal 116 having P polarization to pass through the polarizing mirror 508 towards the polarization selector 400, while the first portion of the second optical signal 116 having S polarization can be reflected by the polarizing mirror 508 and discarded (a path of the first portion of the second optical signal 116 having S polarization is not shown in FIG. 6).

Again, as described above, the polarization selector 400 selectively allows the passed optical signal to be optically propagated to the lens 110 during a time period and inhibits the blocked optical signal from being optically propagated to the lens during the time period. The passed optical signal is one of the first portion of the first optical signal 114 having the first polarization or the second portion of the second optical signal 116 having the second polarization. Further, the blocked optical signal is a differing one of the first portion of the first optical signal 114 having the first polarization or the second portion of the second optical signal 116 having the second polarization. For instance, as depicted in FIG. 6, the polarization selector 400 is selectively allowing the first portion of the first optical signal 114 having S polarization to be optically propagated to the lens 110 during a particular time period; in this example, the lens 110 causes the passed optical signal (e.g., the first portion of the first optical signal 114 having S polarization representative of the first eye 104) to be incident on the camera sensor 112 during the time period (e.g., to generate iris scan data for the iris of the first eye 104). Moreover, during a differing time period, the polarization selector 400 can selectively allowing the second portion of the second optical signal 116 having P polarization to instead be optically propagated to the lens 110, where the lens 110 can cause such passed optical signal to be incident on the camera sensor 112 during the differing time period (e.g., to generate iris scan data for the iris of the second eye 106).

With reference to FIG. 7, illustrated is another example of the iris scanning device 100 of FIG. 1. The iris scanning device 100 of FIG. 7 includes a selector (e.g., the selector 108), the lens 110, and the camera sensor 112. In the example of FIG. 7, the selector includes a movable mirror 700 and a stationary mirror 702. The movable mirror 700 is controllable to align with one of the first eye 104 or the second eye 106 of the person during a time period. Depending on the alignment of the movable mirror 700, the first optical signal 114 representative of the first eye 104 or the second optical signal 116 representative of the second eye 106 can be reflected by the movable mirror 700 to the stationary mirror 702 and thereafter can be reflected by the stationary mirror 702 to the lens 110. Accordingly, the passed optical signal (e.g., optically propagated from the stationary mirror 702 to the lens 110), which can be representative of one of the first eye 104 or the second 106 during a particular time period, can be reflected by the movable mirror 700 to the stationary mirror 702 and thereafter can be reflected by the stationary mirror 702 to the lens 110.

As depicted in FIG. 7 at 704, the movable mirror 700 is aligned with the second eye 106 during a particular time period; the second optical signal 116 representative of the second eye 106 is reflected by the movable mirror 700 to the stationary mirror 702 and thereafter reflected by stationary mirror 702 to the lens 110 (e.g., the lens 110 causes the second optical signal 116 to be incident on the camera sensor 112 during the particular time period). During a differing time period, as depicted in FIG. 7 at 706, the movable mirror 700 can be repositioned such that the first optical signal 114 is reflected by the movable mirror 700 to the stationary mirror and thereafter reflected by the stationary mirror 702 to the lens (e.g., the lens 110 causes the first optical signal 114 to be incident on the camera sensor 112 during the differing time period).

Reference is now generally made to FIGS. 5-7. Although not shown, it is contemplated that the iris scanning devices 100 shown in such examples can further include the image processing system 120 and the controller 122.

Figure 8:
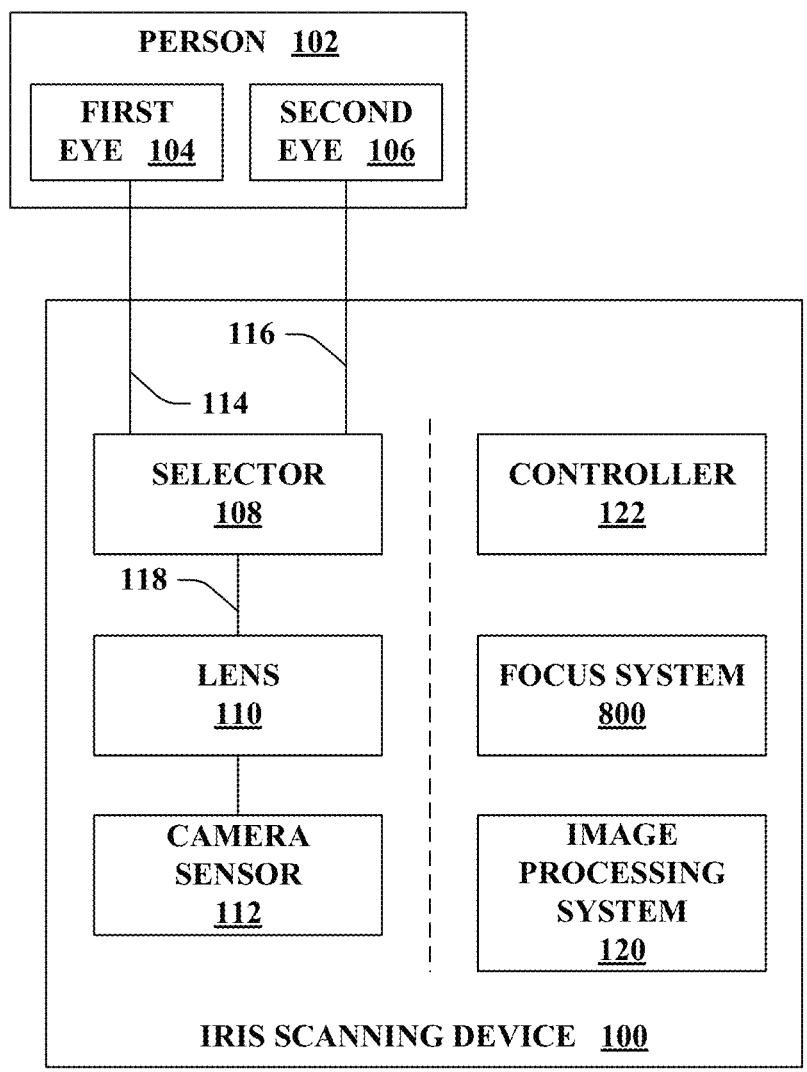
FIG. 8 illustrates a functional block diagram of another example of the iris scanning device of FIG. 1.

With reference to FIG. 8, illustrated is the iris scanning device 100 according to various embodiments. The iris scanning device 100 can again include the selector 108, the lens 110, and the camera sensor 112. Moreover, the iris scanning device 100 can include the image processing system 120 and the controller 122. The iris scanning device 100 of FIG. 8 can be any of the iris scanning devices set forth in FIGS. 1, 4, 5, 6, and/or 7.

In the embodiment depicted in FIG. 8, the iris scanning device 100 includes a focus system 800. The focus system 800 may be implemented in software stored in memory of the iris scanning device 100, for instance. The focus system 800 may include one or more machine learning models. The focus system 800 is configured to adjust a focus of the lens 110 such that the passed optical signal 118 that is received at the camera sensor 112 produces an image in which an eye of the person 102 is in focus. The focus system 800 can adjust the focus of the lens 110 based upon image(s) captured by the camera sensor 112 and/or a differing camera of the iris scanning device 100 (e.g., a differing camera for detecting a face of the person 102, where the differing camera is not used for iris scanning). In an example, after an image of the first eye 104 is captured, the focus system 800 can adjust the focus of the lens 110 from a first focus to a second focus such that the camera sensor 112 captures an image of the second eye 106 that is in focus, even when the second eye 106 is in a different plane than the first eye 104 due to the person 102 shifting his/her face during the iris scanning process. Moreover, even when the first eye 104 and the right eye 106 are in the same plane, the focus system 800 functions to compensate for different beam path lengths.

Figure 9:
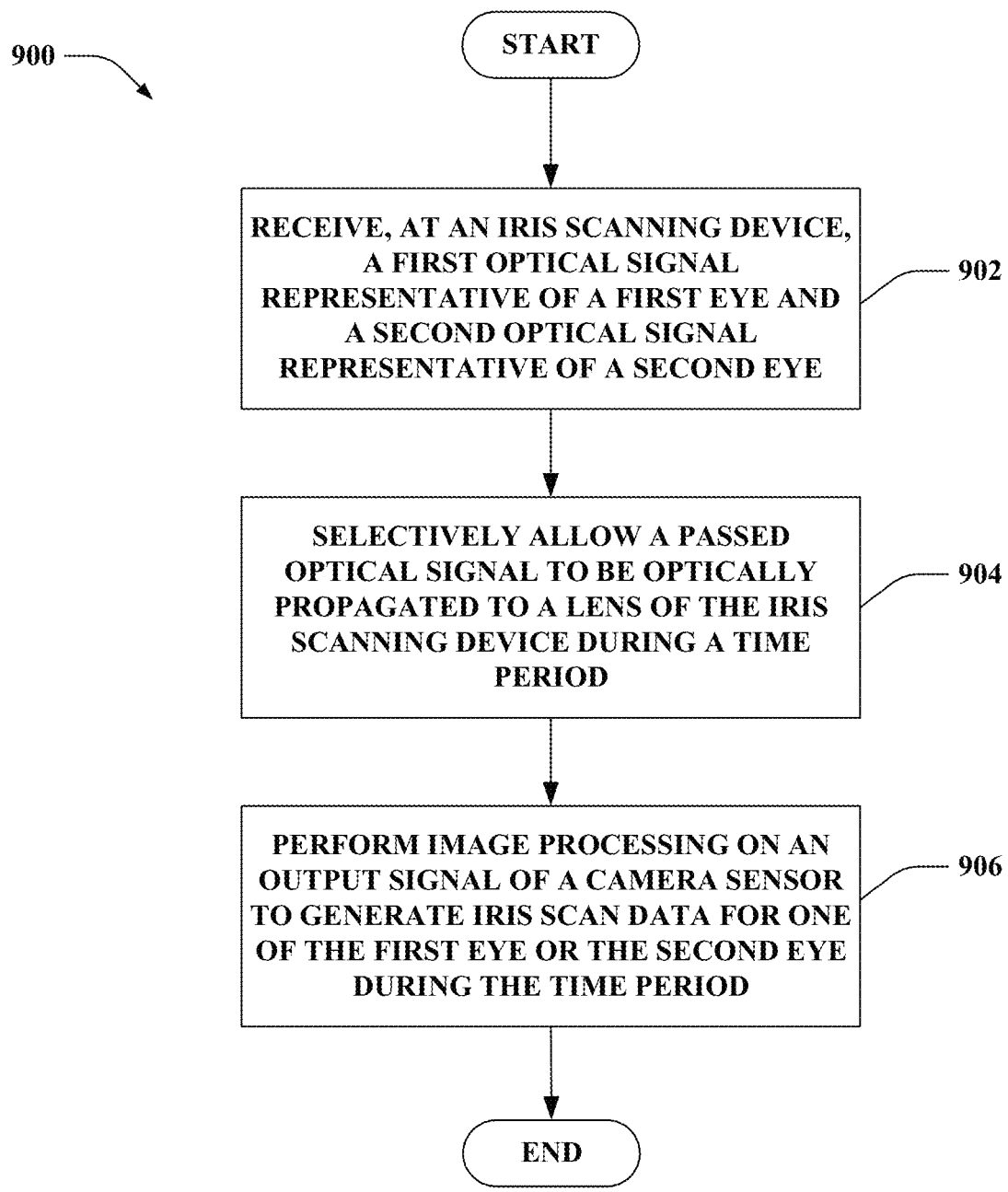
FIG. 9 is a flow diagram that illustrates an exemplary methodology of employing an iris scanning device.

FIG. 9 illustrates an exemplary methodology relating to employing an iris scanning device. While the methodology is shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

FIG. 9 illustrates a methodology 900 of employing an iris scanning device. At 902, a first optical signal representative of a first eye of a person and a second optical signal representative of a second eye of the person can be received at the iris scanning device. At 904, a passed optical signal can be selectively allowed to be optically propagated to a lens of the iris scanning device during a time period. A blocked optical signal can further be inhibited from being optically propagated to the lens during the time period. The passed optical signal can be one of the first optical signal or the second optical signal during the time period. Moreover, the blocked optical signal can be a differing one of the first optical signal or the second optical signal during the time period. Further, the lens can cause the passed optical signal to be incident on a camera sensor during the time period. At 906, image processing can be performed on an output signal of the camera sensor to generate iris scan data for one of the first eye or the second eye of the person during the time period. Moreover, the methodology 900 can include switching between allowing the first optical signal or the second optical signal to be optically propagated to the lens over time. Accordingly, the passed optical signal can be the differing one of the first optical signal or the second optical signal during a differing time period. Thus, when the person is employing the iris scanning device, iris scan data for both eyes can be generated (e.g., in a single session, iris scan data for one eye can be generated during the time period and iris scan data for the second eye can be generated during the differing time period).

Figure 10:
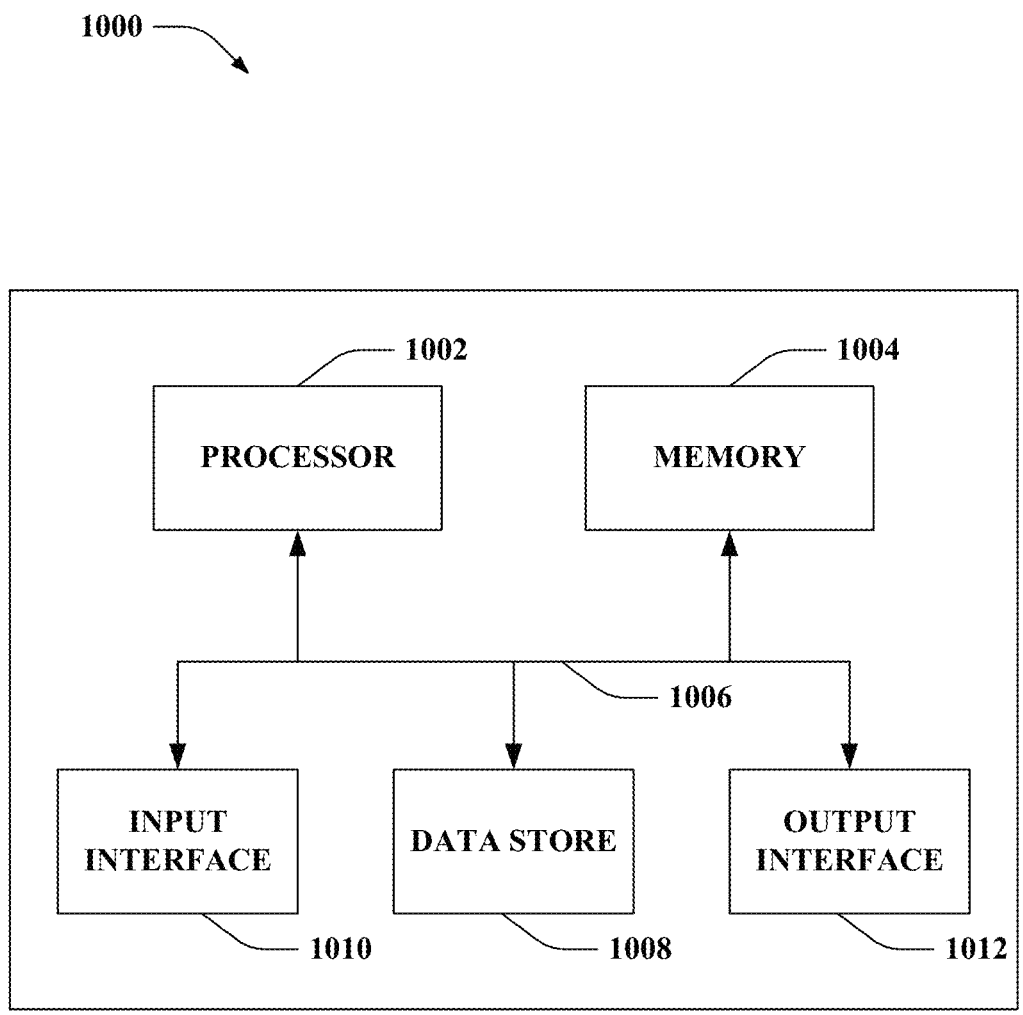
FIG. 10 illustrates an exemplary computing system.

Referring now to FIG. 10, a high-level illustration of an exemplary computing system 1000 (e.g., a computing device, a computing unit) that can be used in accordance with the systems and methodologies disclosed herein is illustrated. For instance, the iris scanning device 100 can be or include the computing system 1000. According to other embodiments, the computing system 1000 can be in communication with the iris scanning device 100 (e.g., the computing system 1000 can be a backend server in communication with the iris scanning device 100). The computing system 1000 includes at least one processor 1002 that executes instructions that are stored in a memory 1004. The instructions may be, for instance, instructions for implementing functionality described as being carried out by one or more systems discussed above or instructions for implementing one or more of the methods described above. The processor 1002 may be a graphics processing unit (GPU), a plurality of GPUs, a central processing unit (CPU), a plurality of CPUs, a multi-core processor, etc. The processor 1002 may access the memory 1004 by way of a system bus 1006. In addition to storing executable instructions, the memory 1004 may also store iris scan data, and so forth.

The computing system 1000 additionally includes a data store 1008 that is accessible by the processor 1002 by way of the system bus 1006. The data store 1008 may include executable instructions, iris scan data, etc. The computing system 1000 also includes an input interface 1010 that allows external devices to communicate with the computing system 1000. For instance, the input interface 1010 may be used to receive instructions from an external computer device, etc. The computing system 1000 also includes an output interface 1012 that interfaces the computing system 1000 with one or more external devices.

Additionally, while illustrated as a single system, it is to be understood that the computing system 1000 may be a distributed system. Thus, for instance, several devices may be in communication by way of a network connection and may collectively perform tasks described as being performed by the computing system 1000.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

The features described herein relate to an iris scanning device according to at least the examples provided below.

(A1) In one aspect, some embodiments include an iris scanning device that includes a selector, a lens optically coupled to the selector, and a camera sensor optically coupled to the lens. The selector is configured to receive a first optical signal and a second optical signal, and the first optical signal is representative of a first eye of a person and the second optical signal is representative of a second eye of the person. The selector selectively allows a passed optical signal to be optically propagated to the lens during a time period and inhibits a blocked optical signal from being optically propagated to the lens during the time period, the passed optical signal being one of the first optical signal or the second optical signal during the time period, and the blocked optical signal being a differing one of the first optical signal or the second optical signal during the time period. The lens causes the passed optical signal to be incident on the camera sensor during the time period.

(A2) In some embodiments of the iris scanning device of (A1), the iris scanning device further includes a computing system that includes a processor and memory. The memory stores computer-executable instructions that, when executed by the processor, cause the processor to perform acts including performing image processing on an output signal of the camera sensor to generate iris scan data for one of the first eye or the second eye of the person during the time period.

(A3) In some embodiments of the iris scanning device of at least one of (A1)-(A2), the iris scanning device includes a single camera sensor utilized for generating iris scan data, the camera sensor being the single camera sensor.

(A4) In some embodiments of the iris scanning device of at least one of (A1)-(A3), the iris scanning device further includes a controller that causes the selector to switch between allowing the first optical signal or the second optical signal to be optically propagated to the lens over time.

(A5) In some embodiments of the iris scanning device of at least one of (A1)-(A4), the passed optical signal is the differing one of the first optical signal or the second optical signal during a differing time period, and the blocked optical signal is the one of the first optical signal or the second optical signal during the differing time period.

(A6) In some embodiments of the iris scanning device of at least one of (A1)-(A5), the selector includes a movable mirror and a stationary mirror, wherein the movable mirror is controllable to align with one of the first eye or the second eye of the person during the time period such that the passed optical signal representative of the first eye or the second eye is reflected by the movable mirror to the stationary mirror and thereafter is reflected by the stationary mirror to the lens.

(A7) In some embodiments of the iris scanning device of at least one of (A1)-(A5), the iris scanning device further includes front end optics configured to receive the first optical signal from the first eye and the second optical signal from the second eye of the person and a polarization beam splitter. The polarization beam splitter optically propagates a first portion of the first optical signal having a first polarization to the selector and a second portion of the second optical signal having a second polarization to the selector, wherein the polarization beam splitter inhibits optical propagation of a second portion of the first optical signal having the second polarization to the selector and a first portion of the second optical signal having the first polarization to the selector, and wherein the first polarization and the second polarization are orthogonal to each other. The selector includes a polarization selector that allows one of the first polarization or the second polarization to pass to the lens and inhibits a differing one of the first polarization or the second polarization from passing to the lens.

(A8) In some embodiments of the iris scanning device of (A7), the polarization selector is an electrooptical polarization selector.

(A9) In some embodiments of the iris scanning device of (A7), the polarization selector is a mechanical polarization selector.

(A10) In some embodiments of the iris scanning device of at least one of (A7)-(A9), the front end optics include a first mirror configured to reflect the first optical signal from the first eye to the polarization beam splitter; and a second mirror configured to reflect the second optical signal from the second eye to the polarization beam splitter.

(A11) In some embodiments of the iris scanning device of at least one of (A7)-(A9), the front end optics include a first mirror configured to reflect the first optical signal from the first eye to the polarization beam splitter; a second mirror; and a third mirror. The second mirror is configured to reflect the second optical signal from the second eye to the third mirror, and the third mirror is configured to reflect the second optical signal from the second mirror to the polarization beam splitter.

(A12) In some embodiments of the iris scanning device of at least one of (A7)-(A10), the iris scanning device further includes a quarter waveplate and a mirror. The polarization beam splitter reflects a reflected portion of the second optical signal towards the mirror, the reflected portion of the second optical signal reflected by the polarization beam splitter having the first polarization. The reflected portion of the second optical signal reflected by the polarization beam splitter passes through the quarter waveplate, is reflected by the mirror, passes through the quarter waveplate, and returns to the polarization beam splitter having the second polarization. The reflected portion of the second optical signal that returns to and passes through the polarization beam splitter having the second polarization is the second portion of the second optical signal having the second polarization.

(B1) In another aspect, some embodiments include an iris scanning device that include front end optics configured to receive a first optical signal from a first eye of a person and a second optical signal from a second eye of the person; a polarization beam splitter optically coupled to the front end optics; a polarization selector optically coupled to the polarization beam splitter; a lens optically coupled to the polarization selector; and a camera sensor optically coupled to the lens. The polarization beam splitter optically propagates a first portion of the first optical signal having a first polarization to the polarization selector and a second portion of the second optical signal having a second polarization to the polarization selector, wherein the polarization beam splitter inhibits optical propagation of a second portion of the first optical signal having the second polarization to the polarization selector and a first portion of the second optical signal having the first polarization to the polarization selector, and wherein the first polarization and the second polarization are orthogonal to each other. The polarization selector selectively allows a passed optical signal to be optically propagated to the lens during a time period and inhibits a blocked optical signal from being optically propagated to the lens during the time period, the passed optical signal being one of the first portion of the first optical signal having the first polarization or the second portion of the second optical signal having the second polarization, and the blocked optical signal being a differing one of the first portion of the first optical signal having the first polarization or the second portion of the second optical signal having the second polarization. The lens causes the passed optical signal to be incident on the camera sensor during the time period.

(B2) In some embodiments of the iris scanning device of (B1), image processing is performed on an output signal of the camera sensor to generate iris scan data for one of the first eye or the second eye of the person during the time period.

(B3) In some embodiments of the iris scanning device of at least one of (B1)-(B2), the passed optical signal is the differing one of the first portion of the first optical signal having the first polarization or the second portion of the second optical signal having the second polarization during a differing time period, and the blocked optical signal is the one of the first portion of the first optical signal having the first polarization or the second portion of the second optical signal having the second polarization during the differing time period (B4) In some embodiments of the iris scanning device of at least one of (B1)-(B3), the front end optics include a first mirror configured to reflect the first optical signal from the first eye to the polarization beam splitter, wherein the polarization beam splitter reflects the first portion of the first optical signal having the first polarization to the polarization selector; and a third mirror. The second mirror is configured to reflect the second optical signal from the second eye to the third mirror, and the third mirror is configured to reflect the second optical signal from the second mirror to the polarization beam splitter. The polarization beam splitter transmits the second portion of the second optical signal having the second polarization to the polarization selector.

(B5) In some embodiments of the iris scanning device of at least one of (B1)-(B4), the iris scanning device further includes a quarter waveplate; and a mirror. The polarization beam splitter reflects a reflected portion of the second optical signal towards the mirror, the reflected portion of the second optical signal reflected by the polarization beam splitter having the first polarization. The reflected portion of the second optical signal reflected by the polarization beam splitter passes through the quarter waveplate, is reflected by the mirror, passes through the quarter waveplate, and returns to the polarization beam splitter having the second polarization. The reflected portion of the second optical signal that returns to and passes through the polarization beam splitter having the second polarization is the second portion of the second optical signal having the second polarization.

(C1) In another aspect, some embodiments include a method of employing an iris scanning device, where the method includes receiving, at the iris scanning device, a first optical signal representative of a first eye of a person and a second optical signal representative of a second eye of the person. The method also includes selectively allowing a passed optical signal to be optically propagated to a lens of the iris scanning device during a time period and inhibiting a blocked optical signal from being optically propagated to the lens during the time period, the passed optical signal being one of the first optical signal or the second optical signal during the time period, the blocked optical signal being a differing one of the first optical signal or the second optical signal during the time period, and the lens causes the passed optical signal to be incident on a camera sensor during the time period. The method further includes performing image processing on an output signal of the camera sensor to generate iris scan data for one of the first eye or the second eye of the person during the time period.

(C2) In some embodiments of the method of (C1), the method also includes switching between allowing the first optical signal or the second optical signal to be optically propagated to the lens over time.

(C3) In some embodiments of at least one of the methods of (C1)-(C2), the passed optical signal is the differing one of the first optical signal or the second optical signal during a differing time period, and the blocked optical signal is the one of the first optical signal or the second optical signal during the differing time period.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. An iris scanning device, comprising:
    front end optics configured to receive a first optical signal from a first eye and a second optical signal from a second eye of a person;
    a polarization beam splitter;
    a polarization selector;
    a lens optically coupled to the polarization selector; and
    a camera sensor optically coupled to the lens;
    wherein the polarization beam splitter optically propagates a first portion of the first optical signal having a first polarization to the polarization selector and a second portion of the second optical signal having a second polarization to the polarization selector, wherein the polarization beam splitter inhibits optical propagation of a second portion of the first optical signal having the second polarization to the polarization selector and a first portion of the second optical signal having the first polarization to the polarization selector, and wherein the first polarization and the second polarization are orthogonal to each other;
    wherein the polarization selector is configured to receive the first portion of the first optical signal and the second portion of the second optical signal;
    wherein the first optical signal is representative of the first eye of the person and the second optical signal is representative of the second eye of the person;
    wherein the polarization selector selectively allows a passed optical signal to be optically propagated to the lens during a time period and inhibits a blocked optical signal from being optically propagated to the lens during the time period, the passed optical signal being one of the first portion of the first optical signal or the second portion of the second optical signal during the time period, and the blocked optical signal being a differing one of the first portion of the first optical signal or the second portion of the second optical signal during the time period;
    wherein the polarization selector allows one of the first polarization or the second polarization to pass to the lens and inhibits a differing one of the first polarization or the second polarization from passing to the lens; and
    wherein the lens causes the passed optical signal to be incident on the camera sensor during the time period.

2. The iris scanning device of claim 1, further comprising:
    a computing system, comprising:
        a processor; and
        memory that stores computer-executable instructions that, when executed by the processor, cause the processor to perform acts comprising:
            performing image processing on an output signal of the camera sensor to generate iris scan data for one of the first eye or the second eye of the person during the time period.

3. The iris scanning device of claim 1, wherein the iris scanning device comprises a single camera sensor utilized for generating iris scan data, the camera sensor being the single camera sensor.

4. The iris scanning device of claim 1, further comprising:
    a controller that causes the polarization selector to switch between allowing the first portion of the first optical signal or the second portion of the second optical signal to be optically propagated to the lens over time.

5. The iris scanning device of claim 1, wherein the passed optical signal is the differing one of the first portion of the first optical signal or the second portion of the second optical signal during a differing time period, and the blocked optical signal is the one of the first portion of the first optical signal or the second portion of the second optical signal during the differing time period.

6. The iris scanning device of claim 1, wherein the polarization selector is an electrooptical polarization selector.

7. The iris scanning device of claim 1, wherein the polarization selector is a mechanical polarization selector.

8. The iris scanning device of claim 1, the front end optics comprising:
a first mirror configured to reflect the first optical signal from the first eye to the polarization beam splitter; and
a second mirror configured to reflect the second optical signal from the second eye to the polarization beam splitter.

9. The iris scanning device of claim 1, the front end optics comprising:
a first mirror configured to reflect the first optical signal from the first eye to the polarization beam splitter;
a second mirror; and
a third mirror;
wherein the second mirror is configured to reflect the second optical signal from the second eye to the third mirror, and the third mirror is configured to reflect the second optical signal from the second mirror to the polarization beam splitter.

10. The iris scanning device of claim 1, further comprising:
a quarter waveplate; and
a mirror;
wherein the polarization beam splitter reflects a reflected portion of the second optical signal towards the mirror, the reflected portion of the second optical signal reflected by the polarization beam splitter having the first polarization;
wherein the reflected portion of the second optical signal reflected by the polarization beam splitter passes through the quarter waveplate, is reflected by the mirror, passes through the quarter waveplate, and returns to the polarization beam splitter having the second polarization; and
wherein the reflected portion of the second optical signal that returns to and passes through the polarization beam splitter having the second polarization is the second portion of the second optical signal having the second polarization.

11. The iris scanning device of claim 1, the front end optics comprising:
a first movable mirror configured to align with the first eye of the person; and
a second movable mirror configured to align with the second eye of the person.

12. An iris scanning device, comprising:
front end optics configured to receive a first optical signal from a first eye of a person and a second optical signal from a second eye of the person;
a polarization beam splitter optically coupled to the front end optics;
a polarization selector optically coupled to the polarization beam splitter;
a lens optically coupled to the polarization selector; and
a camera sensor optically coupled to the lens;
wherein the polarization beam splitter optically propagates a first portion of the first optical signal having a first polarization to the polarization selector and a second portion of the second optical signal having a second polarization to the polarization selector, wherein the polarization beam splitter inhibits optical propagation of a second portion of the first optical signal having the second polarization to the polarization selector and a first portion of the second optical signal having the first polarization to the polarization selector, and wherein the first polarization and the second polarization are orthogonal to each other;
wherein the polarization selector selectively allows a passed optical signal to be optically propagated to the lens during a time period and inhibits a blocked optical signal from being optically propagated to the lens during the time period, the passed optical signal being one of the first portion of the first optical signal having the first polarization or the second portion of the second optical signal having the second polarization, and the blocked optical signal being a differing one of the first portion of the first optical signal having the first polarization or the second portion of the second optical signal having the second polarization; and
wherein the lens causes the passed optical signal to be incident on the camera sensor during the time period.

13. The iris scanning device of claim 12, the front end optics comprising:
a first movable mirror configured to align with the first eye of the person; and
a second movable mirror configured to align with the second eye of the person.

14. The iris scanning device of claim 12, wherein image processing is performed on an output signal of the camera sensor to generate iris scan data for one of the first eye or the second eye of the person during the time period.

15. The iris scanning device of claim 12, wherein the passed optical signal is the differing one of the first portion of the first optical signal having the first polarization or the second portion of the second optical signal having the second polarization during a differing time period, and the blocked optical signal is the one of the first portion of the first optical signal having the first polarization or the second portion of the second optical signal having the second polarization during the differing time period.

16. The iris scanning device of claim 12, the front end optics comprising:
a first mirror configured to reflect the first optical signal from the first eye to the polarization beam splitter, wherein the polarization beam splitter reflects the first portion of the first optical signal having the first polarization to the polarization selector;
a second mirror; and
a third mirror;
wherein the second mirror is configured to reflect the second optical signal from the second eye to the third mirror, and the third mirror is configured to reflect the second optical signal from the second mirror to the polarization beam splitter; and
wherein the polarization beam splitter transmits the second portion of the second optical signal having the second polarization to the polarization selector.

17. The iris scanning device of claim 12, further comprising:
a quarter waveplate; and
a mirror;

wherein the polarization beam splitter reflects a reflected portion of the second optical signal towards the mirror, the reflected portion of the second optical signal reflected by the polarization beam splitter having the first polarization;

wherein the reflected portion of the second optical signal reflected by the polarization beam splitter passes through the quarter waveplate, is reflected by the mirror, passes through the quarter waveplate, and returns to the polarization beam splitter having the second polarization; and wherein the reflected portion of the second optical signal that returns to and passes through the polarization beam splitter having the second polarization is the second portion of the second optical signal having the second polarization.

18. A method of employing an iris scanning device, comprising:

receiving, at front end optics of the iris scanning device, a first optical signal representative of a first eye of a person and a second optical signal representative of a second eye of the person;

splitting the first optical signal and the second optical signal at a polarization beam splitter of the iris scanning device such that a first portion of the first optical signal having a first polarization and a second portion of the second optical signal having a second polarization optically propagate to a polarization selector of the iris scanning device, wherein optical propagation of a second portion of the first optical signal having the second polarization and a first portion of the second optical signal having the first polarization are inhibited, and wherein the first polarization and the second polarization are orthogonal to each other;

selectively allowing, employing the polarization beam splitter, a passed optical signal to be optically propagated to a lens of the iris scanning device during a time period and inhibiting a blocked optical signal from being optically propagated to the lens during the time period, the passed optical signal being one of the first portion of the first optical signal or the second portion of the second optical signal during the time period, the blocked optical signal being a differing one of the first portion of the first optical signal or the second portion of the second optical signal during the time period, and the lens causes the passed optical signal to be incident on a camera sensor during the time period; and performing image processing on an output signal of the camera sensor to generate iris scan data for one of the first eye or the second eye of the person during the time period.

19. The method of claim 18, further comprising:

switching between allowing the first portion of the first optical signal or the second portion of the second optical signal to be optically propagated to the lens over time.

20. The method of claim 18, wherein the passed optical signal is the differing one of the first portion of the first optical signal or the second portion of the second optical signal during a differing time period, and the blocked optical signal is the one of the first portion of the first optical signal or the second portion of the second optical signal during the differing time period.

* * * * *